United States Patent [19]

Kawanami et al.

[11] Patent Number: 4,604,813
[45] Date of Patent: Aug. 12, 1986

[54] APPARATUS FOR DIMENSIONAL INSPECTION OF A PIPE SPOOL, OR FOR MAKING OR CUTTING AND FINISHING AT ITS BOTH ENDS

[75] Inventors: Shumpei Kawanami, Hiratsuka; Hiroshi Nakama, Yokohama, both of Japan

[73] Assignee: Dai-Ichi High Frequency Co., Ltd., Tokyo, Japan

[21] Appl. No.: 703,545

[22] Filed: Feb. 20, 1985

[51] Int. Cl.[4] .............................................. A61B 5/08
[52] U.S. Cl. ....................................... 33/529; 33/549; 33/569
[58] Field of Search ................ 33/529, 549, 573, 568, 33/569

[56] References Cited

U.S. PATENT DOCUMENTS

| | | | |
|---|---|---|---|
| 2,431,100 | 11/1947 | Woods | 33/529 |
| 2,431,101 | 11/1947 | Woods | 33/529 X |
| 3,365,804 | 1/1968 | Fjellstrom | 33/529 |
| 3,545,089 | 12/1970 | Beckwell | 33/529 |
| 3,667,128 | 6/1972 | Morgan | 33/529 |
| 4,120,095 | 10/1978 | Lebourg | 33/529 X |
| 4,122,608 | 10/1978 | Hopf | 33/549 |
| 4,141,147 | 2/1979 | Klassen et al. | 33/529 |

Primary Examiner—William D. Martin, Jr.
Attorney, Agent, or Firm—L. Lawton Rogers, III; Joseph M. Killeen

[57] ABSTRACT

Apparatus used for dimensional inspection of a pipe spool, and further for marking or cutting and finishing of the both ends by means of laying at least an end tangent horizontal and having each center of the cutting end section in a line which is parallel to a base frame.

12 Claims, 9 Drawing Figures

4,604,813

APPARATUS FOR DIMENSIONAL INSPECTION OF A PIPE SPOOL, OR FOR MAKING OR CUTTING AND FINISHING AT ITS BOTH ENDS

BACKGROUND OF THE INVENTION

1. Field of the Invention

This invention is related to an apparatus used for dimensional inspection of a segment of pipe, sometimes called a pipe spool, especially of a three dimensionally bent pipe, and further for marking or cutting and finishing of its both ends.

2. Description of the Prior Art

Generally speaking, there are two kinds of method for pipe spool measurement whichever it may be two dimensional or three dimentional.

One is a method where length of every tangent, radius and angle of the spool are measured one by one, or coordinates of every or some important tangents are measured in regard to a certain coodinate system, and the other is a method where only a length between each center of both ends and only each direction of both end tangents are measured.

The former method may be called here tangent system and the latter diagonal system shortly. This invention has been developed for the purpose not only of measurement of a cubic pipe bend but also of marking or cutting/finishing of its ends very quickly and correctly, therefore diagonal system has been adopted for this invention.

In this invention, at first, it was noticed that every pipe spool with any form may be put on floor naturally having one end tangent be laid parallel to the floor while having the other end tangent be laid directing downwards or in some case horizontal, that means not upwards.

Therefore in this invention, it has been aimed that a pipe spool shall not change its posture while it is handled.

In this invention a pipe spool is denoted P, while an end tangent to be laid horizontal is denoted P1 and the other end tangent P2, and these may be called pipe end P1 or P2.

Basic construction of this invention consists of a horizontal base frame long enough to cover diagonal distance of a pipe spool to be inspected, on which a horizontal or substantially horizontal base plane as the reference of coordinate system exists, is equipped with two sets of rotary table rotatable and may be fixed around an axis vertical to said horizontal base plane having at least one of these two rotary tables be mounted on a slide table slidable and may be fixed relatively to another rotary table, and further specialized that a horizontal pipe end support is mounted on any one of these two rotary table having its horizontal axis intersect the virticalaxis of said rotary table at a determined proper effective height, and besides another pipe end support is mounted on a swing table swingable and may be fiexed around an axis which is supported and fixed on another rotary table so as to let three axes, that is axis of the pipe end support, axis of the swing table and axis of the rotary table intersect each other at a point at the same height with that of said horizontal pipe end support.

As stated before a reason why one end of a pipe spool is to be supported horizontal is that it is the most natural posture of a pipe spool when it is laid freely on a floor, and then such construction is considered not only the most reasonable for loading and disloading of a pipe spool to be inspected, but also it is important that such support is simple.

Horizontal pipe end support for P1 is so formed that said horizontal pipe end should be very easily loaded and unloaded by only lifting or lowering the spool with a crane or hands.

DESCRIPTION OF THE PREFERRED EMBODIMENT

Figure 1:
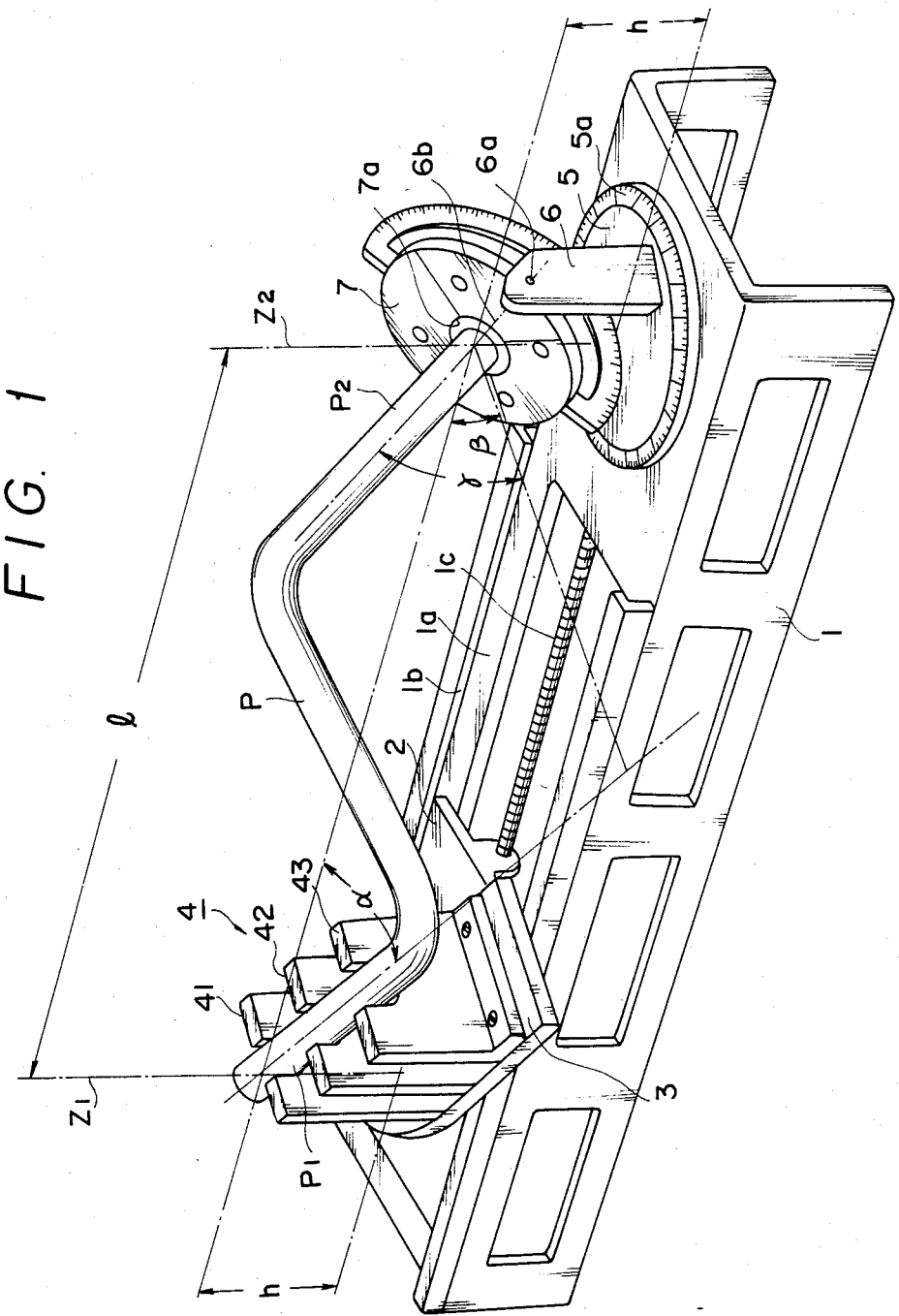
FIG. 1 is a perspective view of basic construction of this invention on which a pipe spool has been mounted to be inspected.

In FIG. 1, 1 is a base frame on which horizontal base plane 1a exists, 2 is a slide table which can move freely or forcedly along longitudinal direction of horizontal base plane 1a and it is guided with guide 1b fixed on base frame 1.

In this case slide table 2 is moved forcedly with screw 1c by rotating it and fixed only by stopping the rotation at any location desired, but screw 1c may be changed with rack or any other proper device.

3 is No. 1 rotary table rotatable around axis Z1 which is equipped on slide table 2 so composed as to rotate freely or may be fixed around a vertical axis Z1 perpendicular to said horizontal base plane 1a.

4 is a support which is a group of supporting plates 41, 42, 43 equipped vertically on No. 1 rotary table 3, and at the center of each plate there is a opening formed U in order to receive P1 easily and the center of each lower half circle is located so as to be in a line which is horizontal to said horizontal base plane 1a and intersects axis Z1 at a proper height h, and this line is the axis of support 4.

Diameter of said lower half of the opening U is taken a little bit larger than outside diameter of P1 with a proper clearance which is large enough to meet certain error in fabrication of a pipe spool, and with which a pipe spool is received and supported easily even when axis of support 4 is fixed previously at an angle determined by calculation as mentioned later.

In case of FIG. 1 supporting plates 41, 42, 43 must be changeable or adjustable in order to fit different size of a pipe spool.

Plate 43 located to inner side than axis Z1 may be omitted or may be composed displaceable if necessary.

At any rate, supporting plate which may be called nail piece equipped in support 4 must be so fabricated that its axis should be horizontal and intersect Z1 at a hight h.

Figure 2:
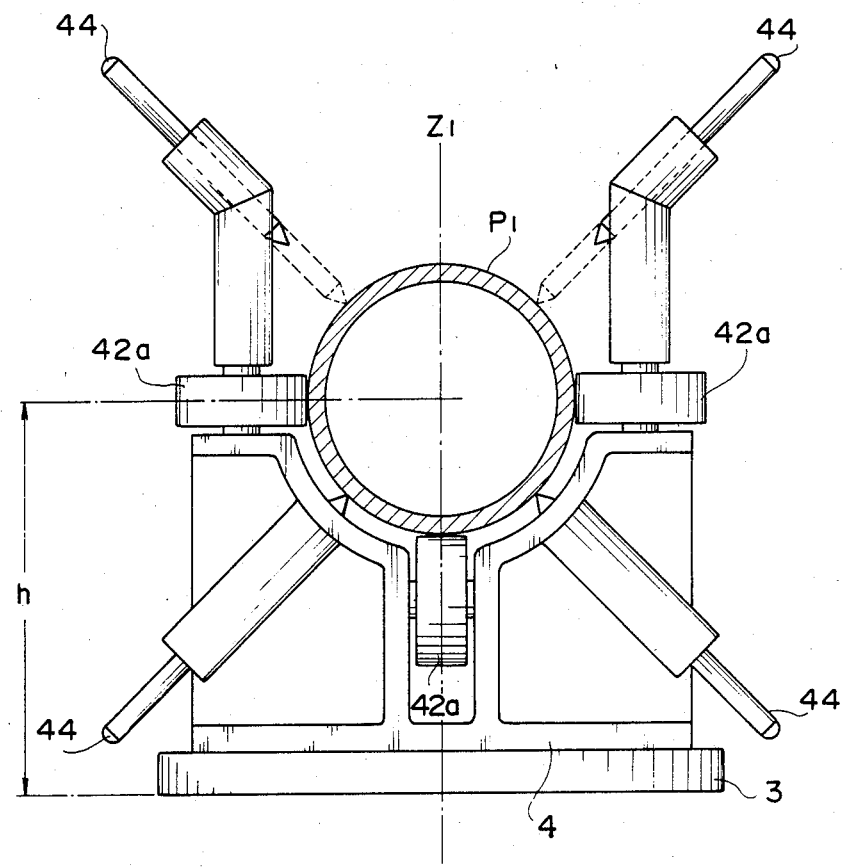
FIG. 2 is front view of another example of horizontal pipe end support and FIG. 3 is side view of it.
Figure 3:
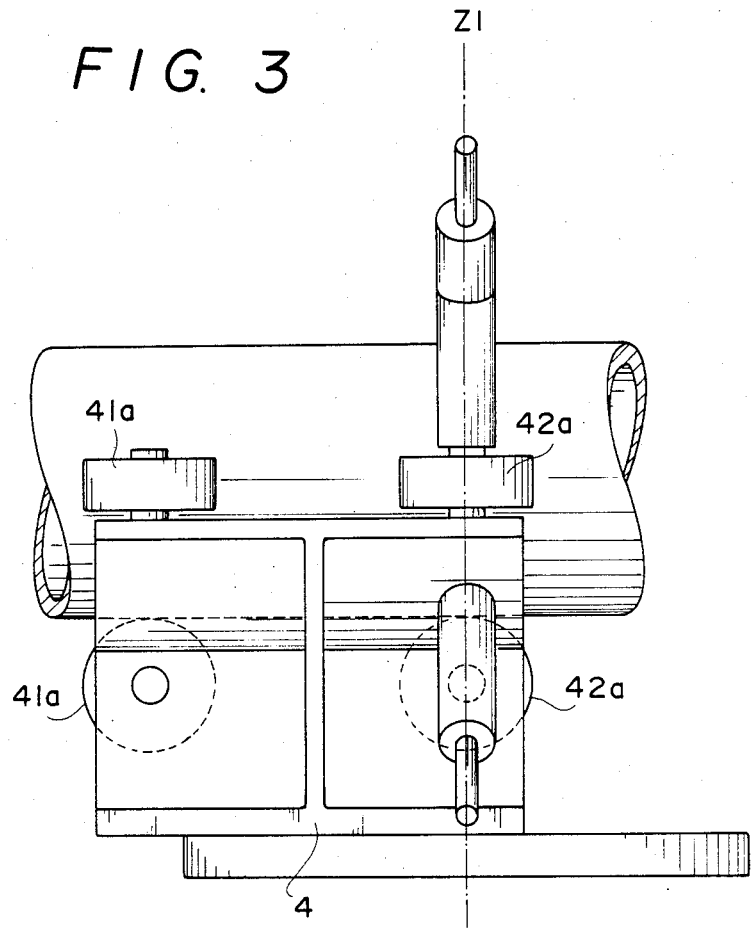

In this invention any other construction of horizontal pipe end support is available, and for example two or three sets of supporting rollers may be applicable in place of plates or nail pieces 41, 42 or 43 as shown in FIG. 2 and FIG. 3.

In FIG. 2 and FIG. 3 horizontal pipe end support 4 is mounted on No. 1 rotary table 3, in which Z1 is the vertical axis of rotation of table 3.

In this case two sets of three rollers 41a and 42b are adopted in place of supporting plate 41 and 42 in FIG. 1.

Each set of rollers is changed with various size rollers so as to fit out side diameter of various size of pipe spool and to have its center axis horizontal and besides intersect axis Z1 at the hight h.

For the purpose of marking a number of center punches 44 (in this case four punches) are so installed that each axis of them is in a plane which includes axis Z1 and perpendicular to axis of support 4 and this plain is called No. 1 cutting plane.

As to distance between roller 41a to roller 42a, larger distance is preferable to get more correct result of measurement of rotating angle of this support.

Rotating angle of table 3 is indicated with a not shown scale installed on table 3 or on slide base 2, and the result is compared to that which calculated with a computer by analytical geometry or vector analysis in space which may be called space analysis altogether.

Vertical tilting of axis of P1 around the axis of support 4 may be measured for example with a level gauge or calculated from clearance between P1 and a roller devided by distance of roller 41a and roller 42a.

As shown in FIG. 2 upper two punches must be pulled up to the right and left as largely enough as these punches do not contact P1 at all so that P1 is easily loaded and unloaded at support 4.

Again in FIG. 1, 5 is No. 2 rotary table equipped on a end of base frame 1 which is rotatable around an vertical axis Z2 parallel to axis Z1, and here Z2 is called No. 2 rotary axis. 6 is a couple of brackets equipped vertically at the circumference of rotary table 5 on the top of which swing axis 6a is so equipped as to have its center axis 6b be parallel to rotary table 5 which is parallel to horizontal base plane 1a, and to intersect axis Z2 at a height h.

Swing table 7 is so equipped as to be swingable around swing axis 6b and may be fixed at any desired swing angle. 5a and 6c is a not shown scale to read angle of rotation of table 5 and of swing of table 7 respectively.

At the center of swing table 7 an opening 7a which is large enough than outside diameter of largest size pipe spool to be inspected is formed.

In order to support pipe end P2 a specially devised pipe end support 8 is installed on the back surface of swing table 7 in this case.

Pipe end support 8 for P2 may be called swingable pipe end support and shortly support 8.

As support 8 is mounted on rotary table 5 and on swing table 7, just likely as universal joint, its axis may be turned to any direction freely to meet direction of pipe end P2 installed.

Detail construction of support 8 would be explained later, and here geometric relations between important parts may be explained.

Support 8 is installed on the surface of swing table 7 so as to have its center axis, which should also be center axis of pipe end P2, intersect rotary axis Z2 and swing axis 6b.

A plane that includes the point of intersection of these three axes and is perpendicular to center axis of swing table 7 is called No. 2 cutting plane, at which marking or cutting is operated.

For geometric calculation or vector analysis a plane parallel to horizontal base plane and at height h from it is taken as xy-plane of xyz coordinate system.

It is convenient to take a point on plane-xy at which axis Z1 intersects it as the origin and to take horizontal axis of P1 as the axis-X of this coordinate system.

Referring to drawing or data sheet for a pipe spool distance l measured from origin at axis Z1 to another vertical axis Z2, angle $\alpha$ from axis x to line l, angle $\beta$ from a line of projection of axis of P2 onto plane-xy to line l, and angle $\gamma$ from axis of P2 to xy-plane are calculated. On the other hand practically length l is measured as a distance between center of No. 1 and No. 2 rotary table and at the same time, angle $\alpha$, $\beta$ and 65 is measured as a rotating angle of each rotary table 3, 5 and swing table 7.

Now, details of support 8 for pipe end P2 is explained. First of all two functions are required for support 8, one of which is to support pipe end P2 having axis of P2 always intersect the both axes Z1 and 6a at a point even if direction of P2 tilts slightly, and the other function is to move pipe end P2 along its axis to and fro within a certain little range in order to set a pipe spool at an optimum location where length l, angle $\alpha$, $\beta$ and $\gamma$ indicates correct value within a certain tolerance.

Therefore support 8 consists of two kinds of mechanism corresponding to two kinds of said function respectively.

To meet these requirements a number of constructions of support 8 are available, and examples are shown in FIGS. 4,5 6 and 7, but the other examples which has said two kinds of function are of course available enough too.

Figure 4:
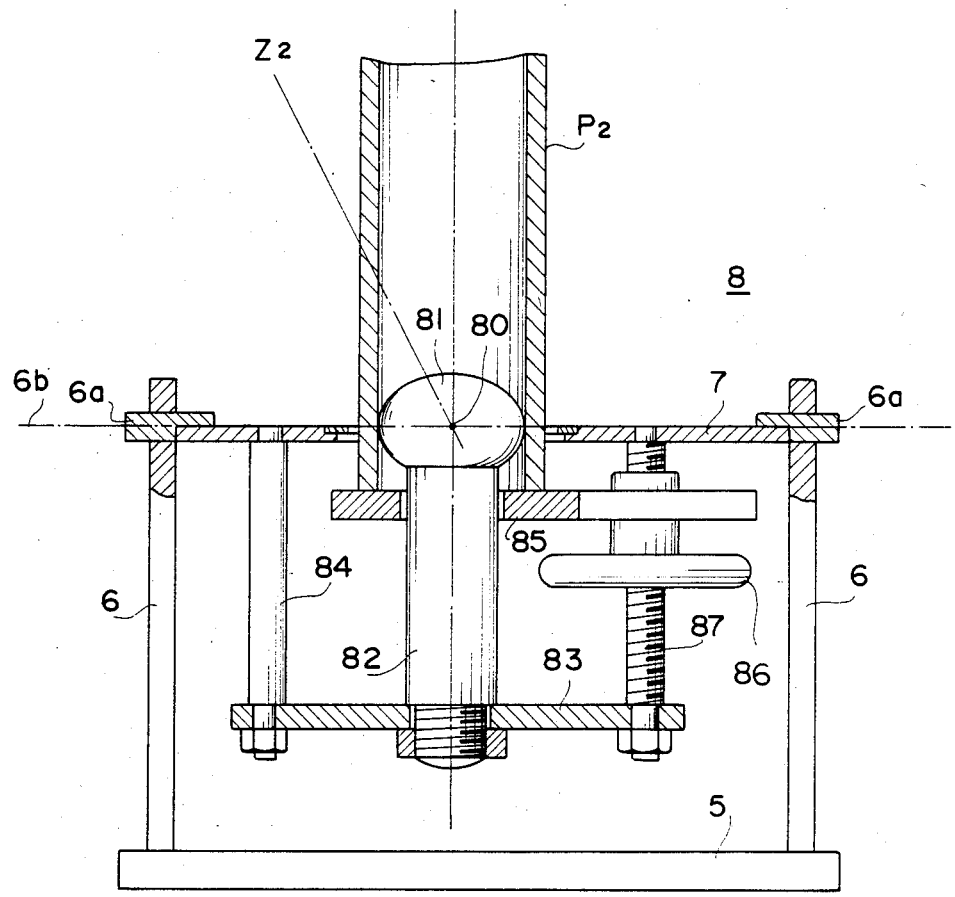
FIG. 4, FIGS. 5–6 and FIG. 7 are examples of a pipe end support equipped on a swing table.

FIG. 4 is an example which may be one of the most simple and therefore one of the cheapest constructions. At this figure intersection point of three axes Z2, 6a and axis of P2 is shown as the center 80 of spherical mandrel 81 which is supported with a stem 82 equipped vertical to and concentric with swing table 7 by means of plate 83 and a number of rods 84.

Diameter of sphere 81 is taken nearly equal to inside diameter of P2. This type of support 8 is simple but sphere 81 must be changed for different pipe sizes. Of course it may be clear that axis of P2 intersects the point of said intersection of axis Z2 and 6a substantially even if it is tilted a little.

Position of P2 is adjusted and fixed with magnet chuck 85 which attract the end of P2 strongly enough to slide P2 longitudinally.

Chuck 85 is moved with a handle 86 equipped on chuck 85 and with a screw 87 stretched and fixed vertically on swing table 7.

Reason why magnet chuck is preferred is that its attracting force is strong enough to move a pipe end longitudinally against certain resistance and more over a slight slip caused by a little tilting of the pipe end is allowable due to special characteristic of magnet chuck.

But any other mechanical chuck equivalent to above magnet chuck may be of course available.

Swing table 7 is swingable freely or forcedly around axis 6b supported with a pair of bracket 6 stretched from No. 2 rotary table 5.

Figure 5:
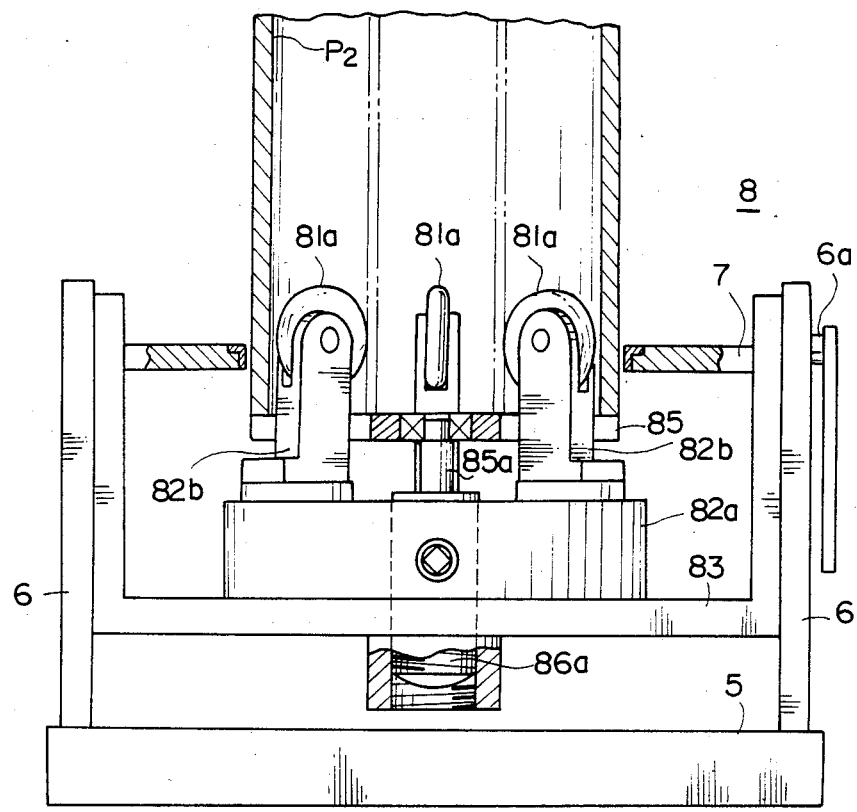

FIG. 5 is improvement of FIG. 4, where spherical mandrel 81 is replaced with a set of three rollers 81a, 81a, 81a each of which is equipped on each slide piece of scroll chuck 82a with a bracket 82b and therefore it can fit large diameter at the inside and fit small size pipe at the outside without change of any part.

Axis of every roller is of course included in the cutting plane II.

Magnet chuck 85 is equipped at the top of spindle 85a which is held slidable and adjustable by means of screw jack or hydraulic cylinder 86a. And tiltable connection of chuck 85 to spindle 85a is more preferable in order to meet slight tilting of P2.

Purpose to use sphere 81 or roller 81a is to make axis of P2 tilt within a little angle 1 or 2 degrees around the vertical axis of swing table 7 which direction is fixed previously at a calculated position.

It is much harder to tilt swing table 7 and to turn rotary table 5 because of its weight and unbarance than to tilt small support 8 freely. Such tilting is required to meet minute but inevitable error caused by fabrication of a pipe spool and required for inevitable tilting of a pipe end which take place when P2 is moved axially through support 8 in order to set the pipe spool at an optimum position mentioned before.

In a special case, when all parts of support 8 is made very light and well balanced so that each swing table and rotary table is easily and freely rotatable corresponding to above mentioned tilting of P2, above tilting of support 8 against swing table 7 is not necessary. In such a case, a simple structure of support 8 similar to horizontal pipe end support 4 in FIG. 1 is available.

Further, a servo-assisted drive system to drive or to adjust rotary table 3, table 5 and swing table 7 in order to correspond to slight tilting of an each pipe end is useful in combination with a proper detector of said tilting.

In order to detect condition of tilting of P2 a various devices may be available.

In FIG. 5, one or a couple of square is shown as one of the most simple examples while another example would appear later when an example for combination of inspection unit and end cutting/finishing unit would be explained.

Automatic measurement and display of tilting of pipe ends should be preferable practically.

Figure 6:
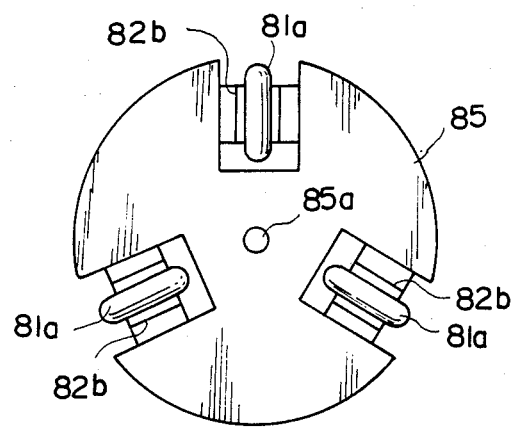

FIG. 6 is a front view of a part of FIG. 5 as seen from the top of it.

Figure 7:
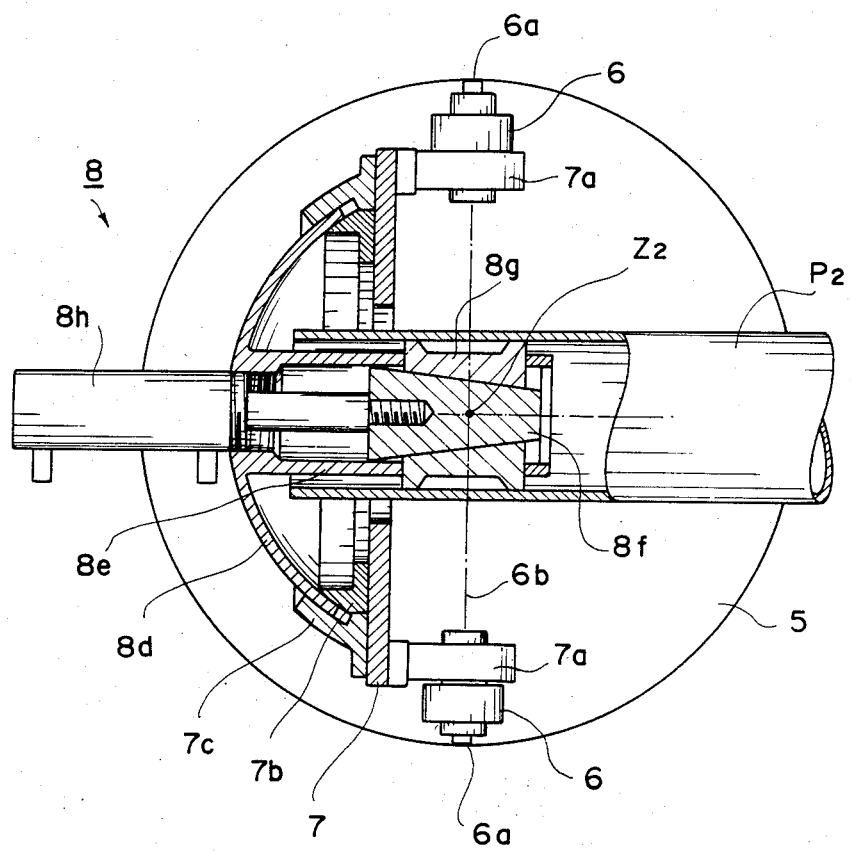
Figure 8:
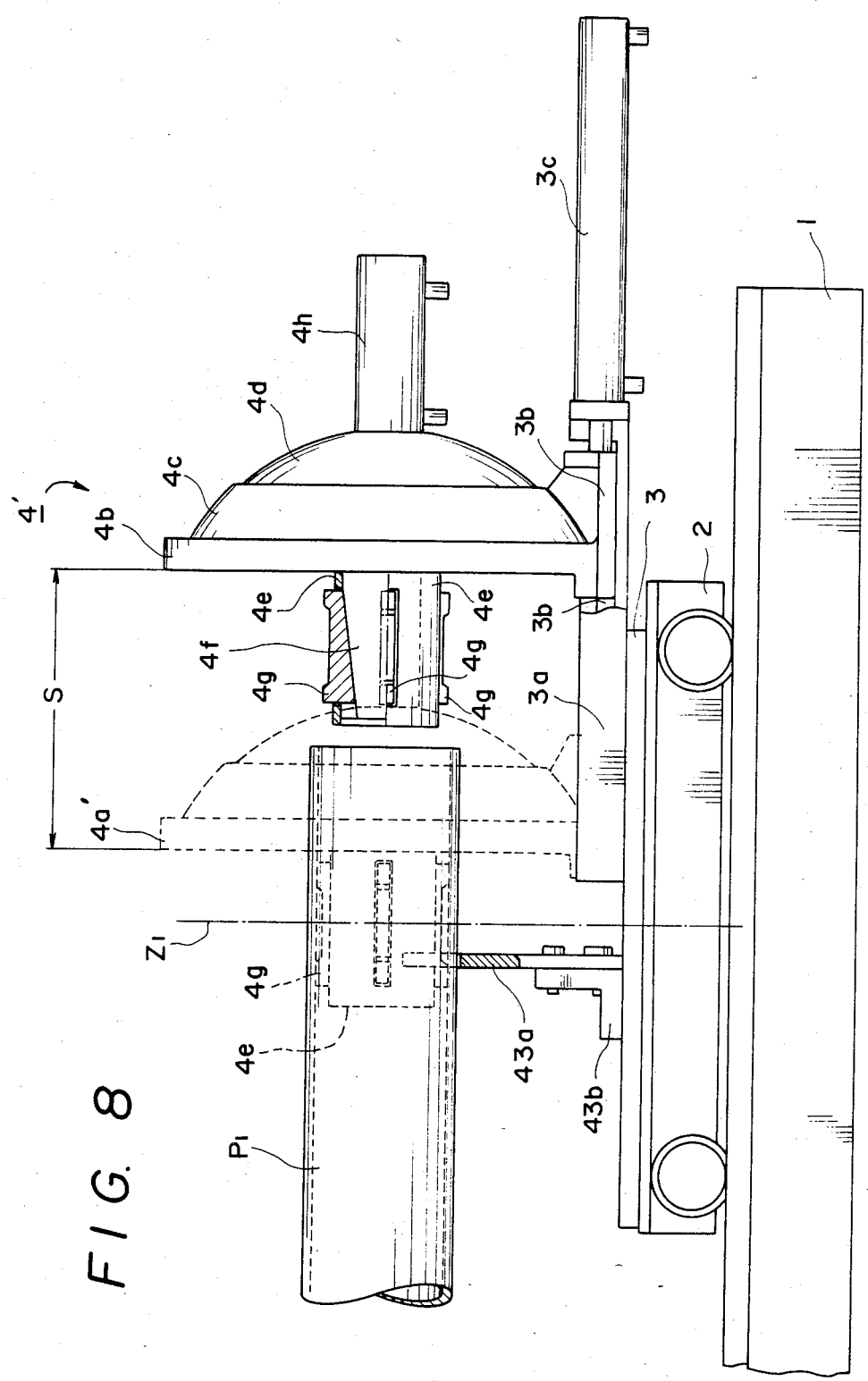
FIG. 8 is a modification of FIG. 7 in order to use it as horizontal pipe end support 4 combined with a subsidiary support.

FIG. 7 is another example of a pipe end support used not only for support 8 but also applicable to support 4 provided with a subsidiary support as well as a slide base of support 4 as shown in FIG. 8.

And FIG. 7 is a view of support 8 for pipe end P2 seen from the top of axis Z2 of rotary table 5.

As mentioned before a pair of brackets 6 is stretched upward from table 5, and swing table 7 is suspended by bracket 6 with axis 6a and bracket 7a.

On the back side of swing table 7, ring pieces 7b and 7c are fixed to bear spherical frame 8d smoothly between each spherical surfaces formed on it in order to allow easy tilting of support 8 within a small angle 1 or 2 degrees.

Support 8 consists of 8d, 8e, 8f, 8g and 8h, where 8d is a main frame of support 8, 8e is a guide sleeve fixed on frame 8d to guide slidable mandrel 8f, and 8g is a number of expand pieces to support a pipe end P2 coaxially with mandrel 8f, 8e and also frame 8d. Pieces 8g are expanded with each slope formed a round mandrel 8f which is pushed and pulled with hydraulic cylinder 8h.

Force of hydraulic cylinder 8h is enlarged so large enough as to improve circularity of P2 in order to get perfect or satisfactory bevel end finishing.

Besides, spherical frame 8d is so equipped on swing table 7 as to keep the center of sphere surface of frame 8d be fixed at the point of intersection of swing axis 6b and rotary axis Z2 inspite of tilting of P2.

FIG. 8 is a side view of support 4' combined with subsidiary support 43a equipped face to face with support 4' on rotary table 3 with a bracket 43b. Support 43a is similar to plate 43 mentioned before.

Subsidiary support 43a is used to support pipe end P1 temporarily before main support 4' is applied to it.

Support 4' consists of 4d, 4e, 4f, 4g and 4h which is similar to 8d, 8e, 8f, 8g and 8h in FIG. 7 respectively.

Spherical frame 4d is supported and guided with a ring frame 4c which inside surface is spherical, and is fixed on slide piece 4b which is supported and guided with guide 3a along a groove 3b.

Slide piece 4b is connected with piston rod of hydraulic cylinder 3c fixed at the end of guide 3a which is fixed on rotary table 3.

Support 43a and support 4' is equipped coaxial. The common axis is of course horizontal at a height h and is rotatable around axis Z1.

Support 4' and subsidiary support 43a mentioned here is used as follows;

Before pipe end P1 is supported with support 4' (4d, 4e, 4f, 4g and 4h) P1 is put temporarily into supporting sheet 43a which function is similar to plate 43 in FIG. 1. At this moment, support 4' is previously shifted to the right as shown in FIG. 8, therefore P1 is easily put into the U shaped opening of supporting sheet 43a, after then support 4' is shifted to the left until the center of sphere of frame 4d coincides axis Z1 by stroke S. Of course at this moment, slide table 2 is fixed to base frame 1 temporarily.

Expand pieces 4g must have been shrunk a little by pulling back slide piece 4f to the right with cylinder 4h so as to be inserted easily into pipe end P1. Before expand pieces 4g are expanded, location of P1 should be adjusted to and fro by means of adjusting location of P2 on support 8 as mentioned before. After location of P2 and therefore P1 is adjusted optimum, expand pieces 4g are expanded by pushing slide mandeal 4f to the left with cylinder 4h, and then P1 is held tightly.

FIG. 8 is a special case in which axis of support 4' is laid coaxial with said center to center line 1 that means said angle $\beta = 0$. It is taken for convenience, but it is the same with normal cases in which angle $\beta$ is different from zero how support 43a and 4' works.

After expand pieces 4g are expanded, tilting of support 4' is checked by means of proper way.

Allowable limit of tilting of support 4' or support 8 is considerable between $\frac{1}{2}$ to 1 degree.

Figure 9:
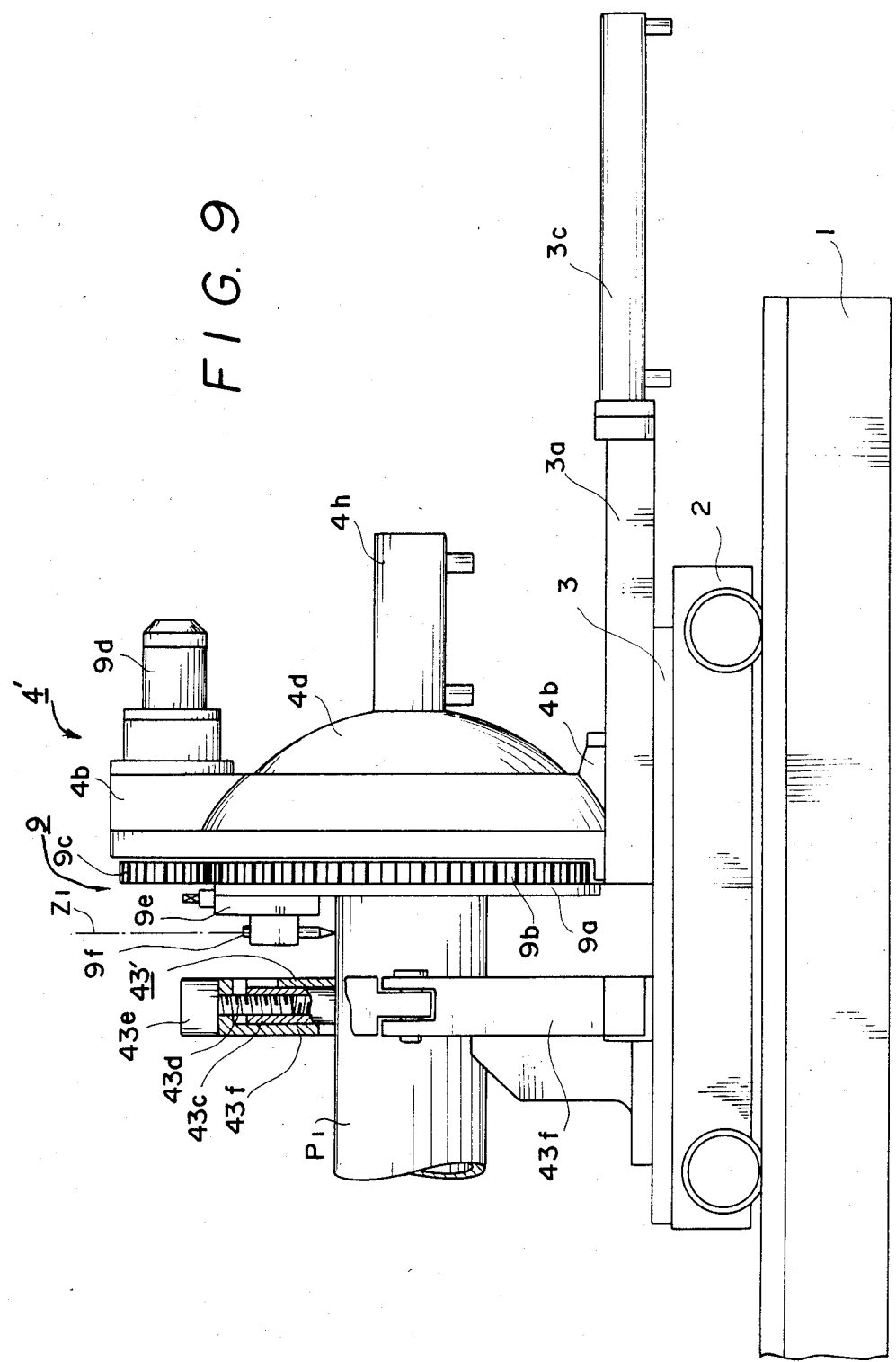
FIG. 9 is an example of combination of pipe end support and pipe end cutting/finishing unit suitable to support both horizontal and the other pipe end.

An example of method to measure angle of such tilting is shown in FIG. 9 as combination with marking or cutting/finishing unit.

FIG. 9 shows an example in which a marking or cutting/finishing unit is combined with a pipe end support 4' similar to that which is shown in FIG. 8. In FIG. 9 and FIG. 8 each same notation indicates the same part, and the marking or cutting/finishing unit is indicated with notation 9 with suffix of a to f.

Supporting sheet 43' as a subsidiary support is improved so as to support P1 enough strongly in order to prevent keen vibration caused by cutting or finishing.

9a is a turning table for marking or cutting/finishing which is turned with gear 9b and pinion 9c driven with a geared motor or geared speed controlled motor 9d mounted on slide piece 4b.

Each function of 4b, 4d, 4h, 3, 3a, 3c, 2 and 1 is the same just as it is in the previous cases.

On turning table 9a a slide head 9e is equipped to be slidable in a radial direction, and is slided manually and/or automatically, on which marking tool or cutting/finishing tool is mounted.

Number of slide head 9e equipped on turning table 9a is free, and method for automatic drive of slide head is also free. For example a gear system utilizing turning of table 9a, or survo motor drive system which electric source may be supplied through slip ring system mounted between turning table 9a and slide piece 4b is available.

Improvement of subsidiary support 43' is as follows, a number of supporting nail 43' is equipped on each slide head 43c which is driven with a screw 43d turned with hydrawlic motor or air motor 43e mounted around holder 43f, which holds slide heads 43c so as to slide it radially, and further each top of nail 43' is rounded as shown in the figure in order to meet tilting of a pipe end around the axis of support 4'.

Moreover location of each nail 43' must be adjustable separately in order to fit outside surface of tilted pipe end P1.

Further, in order to meet the case in which cutting/finishing unit is combined with horizontal pipe end support 4', holder 43f must be sprit into upper and lower two parts so as to make the upper part be opened when the pipe end is put down upon the lower set of nails 43', where each nail top is adjusted manually to hold a pipe end nearly coaxial with support 4' which holds the pipe end when it is shifted to the left.

After the pipe end P1 is put on said lower nails 43' upper part of holder 43f is closed and connected with the lower part so as to support P1 with nails 43' tightly having every nail be pushed inward with screw 43d rotated with hydraulic or air motor 43e.

But it must be noticed, before driving hydraulic or air motor 43e, if pipe end P1 is supported coaxially with support 4' or not, and if it is not coaxial all screw 43d had better be rotated to open nails 43' and then to close each nail hydraulically or pneumatically again.

It is a special characteristic of such drive system when every motor is driven with a common power source that every nail is naturally adjusted to hold P1 coaxial with support 4'.

Further, such combination with marking or cutting/finishing unit may be useful too for pipe end P2, but in this case there is no need of splitting holder 43f into two parts.

What is claimed is:

1. Apparatus for dimensional inspection of a pipe spool or for marking, or cutting and finishing at its both ends comprising a
    base frame, which is long enough to cover the diagonal length of a pipe spool to be inspected, on which a substantially horizontal base plane as the reference for a coordinate system exists, said base frame having first and second rotary tables, said first table being rotatable around an axis vertical to said horizontal base plane, said second table being mounted on a slide table slidable relative to said first rotary table,
    a first horizontal pipe end support mounted on the rotary tables so that its horizontal axis intersects the vertical axis of said rotary table at a determined proper effective height, and
    a second pipe end support mounted on a swing table swingable around an axis which is supported and fixed on another rotary table so as to let three axes, that is axis of the pipe end support, axis of the swing table and axis of the rotary table, intersect each other at a point at the same height with that of said horizontal pipe end support.

2. Apparatus as claimed in claim 1 wherein the horizontal pipe end support includes means to keep its axis horizontal and at a determined effective height and position in spite of change of pipe diameter, said means comprising one of either a supporting plate, nail piece or sets of rollers which are changeable or adjustable to correspond to the outside diameter of a pipe spool to be inspected.

3. Apparatus as claimed in claim 1 wherein the upper side of horizontal pipe end support is formed open so that the horizontal pipe end is put on and put out easily only by lowering and lifting it.

4. Apparatus as claimed in claim 1 wherein said pipe end support allows small additional tilting of the pipe end against the swing table while having three axes, that is axis of the pipe end, the swing axis of the swing table and the vertical axis of rotary table intersect each other at a point at a height equal to that of effective height of horizontal pipe end support, and allows small longitudinal movement of the pipe end through the support so that the pipe spool may be fixed at the optimum position.

5. Apparatus as claimed in claim 4 in which the pipe end is supported and guided with a spherical mandrel and is chucked with a chuck which allows the pipe end be slided longitudinally and be tilted a little at the same time.

6. Apparatus as claimed in claim 4 in which a pipe end is supported with a number of expand pieces pushed to be expanded with a mandrel equipped slidable through a sleeve which is fixed coaxially on a spherical main frame of the other pipe end support, and the mandrel is driven with a hydraulic cylinder fixed behind the main frame.

7. Apparatus as claimed in claim 5 further comprising a subsidiary pipe end support for maintaining the pipe spool at a desired orientation.

8. Apparatus claimed in claim 1 wherein a turning unit to be used for marking or cutting and finishing of a pipe end is provided on one of said tables or on said swing table.

9. Apparatus claimed in claim 2 wherein it is specialized that the upper side of horizontal pipe end support is formed open or formed to be opened and closed freely so that horizontal pipe end is put on and put out easily only by lowering and lifting it with crane or hands.

10. Apparatus claimed in claim 7 wherein it is specialized that a turning unit to be used for marking or cutting and finishing of a pipe end is equipped on a rotary table or a swing table in combination with a pipe end support.

11. Apparatus as claimed in claim 1 wherein the upper side of horizontal pipe end support is formed to be opened and closed freely so that horizontal pipe end is put on and put out easily only by lowering and lifting it.

12. Apparatus as claimed in claim 4 in which the pipe end is supported and guided with a set of supporting rollers and is chucked with a special chuck which allows the pipe end be slided longitudinally and be tilted a little at the same time.

* * * * *